United States Patent [19]

Kuipers et al.

[11] Patent Number: 5,676,420
[45] Date of Patent: Oct. 14, 1997

[54] BICYCLE SADDLE WITH VARIABLE SUPPORT MEANS

[76] Inventors: Raymond J. Kuipers; Dominica R. Kuipers, both of 27312 Via Segundo, Mission Viejo, Calif. 92692

[21] Appl. No.: 635,331

[22] Filed: Apr. 19, 1996

[51] Int. Cl.[6] .................................................. B62J 1/10
[52] U.S. Cl. ........................ 297/204; 297/205; 297/195.1
[58] Field of Search ................................. 297/204, 205, 297/195.1, 215.16, DIG. 2, 452.18, 440.1

[56] References Cited

U.S. PATENT DOCUMENTS

| 304,827 | 9/1884 | Kelley | 297/204 |
|---|---|---|---|
| 455,474 | 7/1891 | McGlinchey | 297/204 |
| 494,408 | 3/1893 | Cable | 297/205 |
| 500,158 | 6/1893 | Sager | 297/204 |
| 500,472 | 6/1893 | Cross | 297/205 |
| 505,938 | 10/1893 | Cleveland | 297/204 |
| 549,692 | 11/1895 | Shaw et al. | 297/204 |
| 605,672 | 6/1898 | Hunt | 297/204 |
| 823,916 | 6/1906 | Brooks et al. | 297/204 X |
| 1,271,375 | 7/1918 | Saunders | 297/204 X |
| 4,429,915 | 2/1984 | Flager | 297/195.1 |
| 5,308,140 | 5/1994 | Yu | 297/195.1 |
| 5,340,192 | 8/1994 | Hsh | 297/195.1 |
| 5,356,198 | 10/1994 | Hughes | 297/195.1 |
| 5,362,126 | 11/1994 | Bontrager | 297/195.1 |
| 5,383,705 | 1/1995 | Voigt | 297/195.1 |
| 5,558,396 | 9/1996 | Yu | 297/195.1 X |

FOREIGN PATENT DOCUMENTS

| 1194147 | 11/1959 | France | 297/195.1 |
|---|---|---|---|
| 1534658 | 8/1968 | France | 297/195.1 |
| 418122 | 6/1947 | Italy | 297/195.1 |
| 728598 | 12/1966 | Italy | 297/195.1 |
| 5711 | of 1897 | United Kingdom | 297/195.1 |
| 285652 | 2/1928 | United Kingdom | 297/204 |

*Primary Examiner*—Peter M. Cuomo
*Assistant Examiner*—Rodney B. White
*Attorney, Agent, or Firm*—Jeffrey P. Aiello; Leary, Titus & Aiello

[57] ABSTRACT

A bicycle saddle providing uniform support to riders of significantly different weight ranges is provided. The saddle includes a variable support assembly for incrementally altering the rider support characteristics of the saddle. The variable support assembly comprises a plurality of lightweight, semi-rigid rods that are dimensioned to extend from the front end to the tail of a shell of the saddle. A plurality of retaining assemblies are affixed to an underside of the shell and are positioned parallel to a longitudinal axis of the saddle. The retaining assemblies each include a pair of receiving portions affixed to the underside of the shell for receiving ends of the rods, for detachably coupling the rods to the shell. A plurality of clips are affixed to the underside of the shell and interposed between receiving portions. The clips snap-fit a center of a rod for retaining the rod against the shell and to prevent the rods from moving perpendicularly to the longitudinal axis of the saddle, when the shell is being flexed by a rider. Each of the plurality of rods is individually detachably coupled to each of the retaining assemblies for incrementally limiting the flexibility of the shell, such that the rods are singularly removed from the retaining assemblies for incrementally increasing the flexibility of the shell for providing an increasingly flexible saddle, and the rods are singularly detachably coupled to the retaining assemblies for incrementally decreasing the flexibility of the shell to provide an increasingly rigid saddle.

18 Claims, 4 Drawing Sheets

BICYCLE SADDLE WITH VARIABLE SUPPORT MEANS

BACKGROUND OF THE INVENTION

1. Field of the Invention

The present invention relates generally to bicycle saddles, and more particularly, to a bicycle saddle with variable supporting means for providing substantially uniform support to riders of different weights.

2. Description of Related Art

The basic design and configuration of bicycle saddles in the prior art is well known. Most bicycle saddles available today comprise a seat portion and a support frame. The saddle is generally horizontal along its longitudinal axis and has a narrow front end, or pommel, and a substantially wide tail portion. The tail portion is wide for supporting a rider and tapers toward the pommel to provide thigh clearance between the pommel and tail when riding the saddle.

The seat portion typically includes a frame or shell that may comprise a semi-rigid injection molded plastic or nylon material. A suitable padding material, such as foam rubber for example, is adhered to the frame for reducing the amount of vibration transmitted to the rider when riding a bicycle that the saddle is mounted on. A leather, vinyl, plastic, or other like material is secured over the padding to cover the padding and provide a seat suitable for riding.

The support frame includes a pair of support rails that extend along the longitudinal axis of the saddle and are affixed to an underside of the frame using known means. The frame is usually molded with suitable retaining members for receiving ends of the support rails, for securing the rails to the frame. The rails extend parallel to each other, with a predetermined distance therebetween for securing the rails to a well known seat post of a bicycle, for mounting the saddle on the bicycle. The rails comprise suitable metal alloys that are rigid and lightweight. Metal alloys used for fabricating the rails include aluminum, steel, titanium, or desired compositions of these or other appropriate metal alloys.

It is well known that riding a bicycle over a period of time becomes increasingly uncomfortable, due to the vibrations transmitted to the bicycle from uneven mad surfaces, and to the rider, since most bicycles are not configured with suspension. Thus, as the rider is riding the bicycle, vibrations caused by bumps or unevenness in the mad are transmitted directly to the rider, with only the padding in the saddle absorbing the vibrations. Over time, the vibrations can cause the rider to become fatigued or sore, potentially forcing the rider to abandon their ride.

A number of bicycle saddles in the prior art have attempted to provide a means for reducing the vibrations transmitted to the rider. One such bicycle saddle is disclosed in U.S. Pat. No. 5,308,140, to Yu, which is directed to a shock-absorbing device for a bicycle seat. The disclosed device comprises a saddle support that mounts to the bottom side of a bicycle seat. The support has a substantially U-shaped horizontal portion with left and right arms. Each of the arms has a distal upwardly curving end with an extension that extends parallel to the arm. Each of the extensions has a distal outwardly bent hook end.

An adjustment unit includes a pair of cylindrical portions. The cylindrical portions are clamped tightly between the respective pairs of extensions and arms. It appears that the adjustment unit is slid between the curving end and hook end of each of the respective pairs of extensions and arms for adjusting the shock absorbing capabilities of the device. However, a disadvantage of the disclosed device is that the device supplants conventional saddle support assemblies and cannot be used with existing an support assembly. Further, it would appear that the adjustment unit adds weight to the bicycle seat, which is disadvantageous when attempting to minimize the weight of the bicycle.

U.S. Pat. No. 5,383,705, to Voigt, discloses a shock absorbing seat for a bicycle. The disclosed seat includes a pair of external shock absorbers and an internal shock absorber mounted in the seat tube of the bicycle. The shock absorbers, as is well known, absorb the impulsive forces generated by the bicycle's wheels contacting an irregular road surface, prior to the forces reaching the seat assembly. However, the plurality of shock absorbers, along with the associated components for mounting the shock absorbers on the seat assembly, would substantially increase the weight of the seat, and subsequently increase the weight of the bicycle. Since minimizing the weight of the bicycle is of particular importance to bicycle racers and long range bicycle tourists, the disclosed seat would be particularly disadvantageous to these riders.

Another bicycle saddle that attempts to reduce the vibrations transmitted to the rider is disclosed in U.S. Pat. No. 4,429,915, to Flager. The patent to Flager is directed to a bicycle seat designed for racing or long range bicycle touring. The disclosed seat includes a seat assembly that provides an elevated region and a sloping region, that respectively contact a rider's ischial tuberosities and pubic symphysis. The seat also includes an air adjustable tube and inserts for fitting the seat to the rider. Additionally, the seat has a sling secured to the seat's longitudinal members, for further fitting the seat to the rider. However, an apparent disadvantage of the disclosed seat, similar to that of the previously discussed prior art references, is that that the several components which comprise the seat and shock absorbing assemblies would substantially increase weight of the seat. Since weight of the bicycle is of some importance, it would appear that a seat having increased weight would again be disadvantageous to bicycle racers and long distance bicycle tourists.

U.S. Pat. No. 5,340,192, to Hsh, discloses a bicycle seat structure. The disclosed seat structure includes a seat frame that is provided with a cut out portion having a rubber resilient element secured thereon. The resilient element comprises a plurality of resilient strips connected with each other by web portions. The resilient element is secured to the seat frame by inserting enlarged head portions formed on ends of the resilient strips into cavities disposed in the seat frame. The disclosed seat structure provides a soft, springy cushion to enhance rider comfort. Additionally, open areas extend between the resilient strips for venting capability of the seat structure, the venting capability avoids the buildup of heat in the contact area beneath the rider's buttocks during riding. A disadvantage of the disclosed seat structure, is that while the resilient rubber strips may provide a suitably soft and springy cushion for riders of one weight range, the structure may not be sufficiently soft and springy for somewhat lighter riders or may be excessively soft and springy for substantially heavier riders, and thus not enhance the comfort of these riders.

There, therefore, exists a need for a bicycle saddle that possess uniform vibration absorption properties and support for riders of different weight ranges and which is not substantially heavy.

OBJECTS OF THE INVENTION

It is therefore an object of the present invention to provide an improved bicycle saddle;

It is another object of the present invention to provide a bicycle saddle having substantially uniform vibration absorption properties and weight support for riders of significantly different weight ranges;

It is a further object of the present invention to provide a bicycle saddle that includes means for producing substantially uniform vibration absorption properties and weight support for riders of significantly different weight ranges that is approximately the weight of the conventional bicycle saddles;

It is yet another object of the present invention to provide a bicycle saddle that includes means for producing substantially uniform vibration absorption properties and weight support for riders of significantly different weight ranges that may be used with a conventional saddle support assembly; and It is a still further object of the present invention to provide a bicycle saddle that includes means for producing substantially uniform vibration absorption properties and weight support for riders of significantly different weight ranges that readily detachably couples to the saddle for facile incremental adjustment of the vibration absorption and weight support properties of the saddle.

SUMMARY OF THE INVENTION

These and other objects and advantages of the present invention are achieved by providing a bicycle saddle having substantially uniform vibration absorption properties and support for riders of significantly different weight ranges. Bicycle saddles typically comprise a seat portion that has a narrow front end region or pommel, a transition region, and a wide tail portion. The seat has a shell that may comprise a semi-rigid polymeric material, for example, for supporting a rider.

The saddle further includes a support assembly that is secured to the seat. The support assembly includes a pair of support rails that extend generally parallel to the longitudinal axis of the seat and are secured to an underside of the shell. The rails are configured so that they have an intermediate portion that extends parallel to the transition region of the seat, and at a predetermined distance from the transition region.

The saddle of the present invention includes a variable support assembly for incrementally altering the rider support characteristics of the saddle. The saddle provides substantially similar weight support and vibration absorption to riders of significantly different weight ranges. The invented variable support assembly includes stiffening means for incrementally increasing or decreasing the flexibility of the shell to provide an increasingly flexible saddle, or to provide an increasingly rigid saddle.

In the preferred embodiment, the stiffening means comprise a plurality of lightweight, semi-rigid rod members. The rods are just sufficiently pliable to detachably couple the rods to retaining means of the present invention. The rods are preferably fabricated of known polymeric, carbon fiber, or other suitable lightweight materials. The rods may be different predetermined rigidities, for providing substantially similar support to riders of significantly different weight ranges.

The variable support assembly further comprises retaining means for detachably coupling the stiffening means to the underside of the shell. In the preferred embodiment, a plurality of retaining means are provided. Each retaining means comprises a pair of receiving portions, with a receiving portion integrally molded to the underside of the front end region of the shell and the other receiving portion molded to the underside of the tail portion of the shell. Each receiving portion has a cavity formed adjacent to the underside of the shell and aligned with the longitudinal axis of the seat. The cavities are configured to receive an end of a stiffening means, for retaining the stiffening means against the underside of the shell, when the stiffening means are detachably retained by the retaining means.

A plurality of deflectable clip members are integrally molded to the underside of the transition region of the shell and interposed between a pair of receiving portions. Each clip member is deflectable to snap-fit a center of a stiffening means when coupled thereto, for preventing the stiffening means from inadvertently detaching from the clip and for retaining the stiffening means against the underside of the shell. The clip prevents the stiffening means from moving perpendicularly to the longitudinal axis of the saddle, when the shell is being flexed by a rider riding the saddle, to aid with increasing the rigidity of the saddle.

In the preferred embodiment, each of the plurality of rod members is individually detachably coupled to each of the plurality of retaining means. The rods are singularly removed from the retaining means for incrementally increasing the flexibility of the shell to provide an increasingly flexible saddle and are singularly detachably coupled to the retaining means for incrementally decreasing the flexibility of the shell to provide an increasingly rigid saddle.

Each of the rods is coupled to the retaining means, by deflecting the ends of a desired one of the rods relative to the center thereof for disposing the ends of the rod in the receiving portions of a desired one of the retaining means. The resiliency of the rod realigns the center of the rod with the ends thereof to force-fit the center of the rod through the opening in the clip of the desired retaining means, for snap-fitting the rod to the clip, thus detachably coupling the rod to the desired retaining means. Each of the rods is singularly removed from the retaining means, by deflecting the center of the rod away from the underside of the shell for deflecting the ends of the clip to release the rod from the clip. The center of the rod is deflected away from the underside of the shell until the ends thereof are removed from the receiving portions for detaching the rod from the retaining means. Thus, the rods can be either detachably coupled to, or removed from, the retaining means without necessitating the use of tools, for providing a readily changeable support assembly.

As previously discussed, the rod members may be different predetermined rigidities, for providing substantially similar support to riders of significantly different weight ranges. For example, desired ones of the rods may be fabricated to a first predetermined stiffness or rigidity. Each of the rods having the first rigidity is preferably capable of increasing the weight support capability of the saddle, from approximately 5 to approximately 10 pounds. Thus, the invented saddle with the rods coupled thereto, provides a rider weighing approximately 135 pounds the same support afforded a rider weighing approximately 110 pounds, without the rods coupled to the saddle. Other desired ones of the rods may be fabricated to a second predetermined rigidity for increasing the weight support capability of the saddle from approximately 10 to approximately 25 pounds per rod. Still other desired ones of the rods may be fabricated to a third predetermined rigidity for increasing the weight support capability of the saddle from approximately 30 to approximately 50 pounds per rod.

Additionally, the rider may detachably couple only one or two rods to a pair of receiving portions, depending upon the support desired by the rider. Further, the rider can couple rods of any of the predetermined rigidities to the plurality of receiving portions, depending upon the support, flexibility, and vibration absorption characteristics of the saddle desired by the rider. Thus, any combination of rods, from having no rods coupled to the receiving portions of the saddle, to having three rods of the third predetermined rigidity coupled to the receiving portions, can be used to provide a saddle that is adjusted to the specific weight of the rider, or a somewhat narrow weight range, for providing a saddle having optimal rider support and vibration absorption characteristics for the rider.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein.

Figure 1:
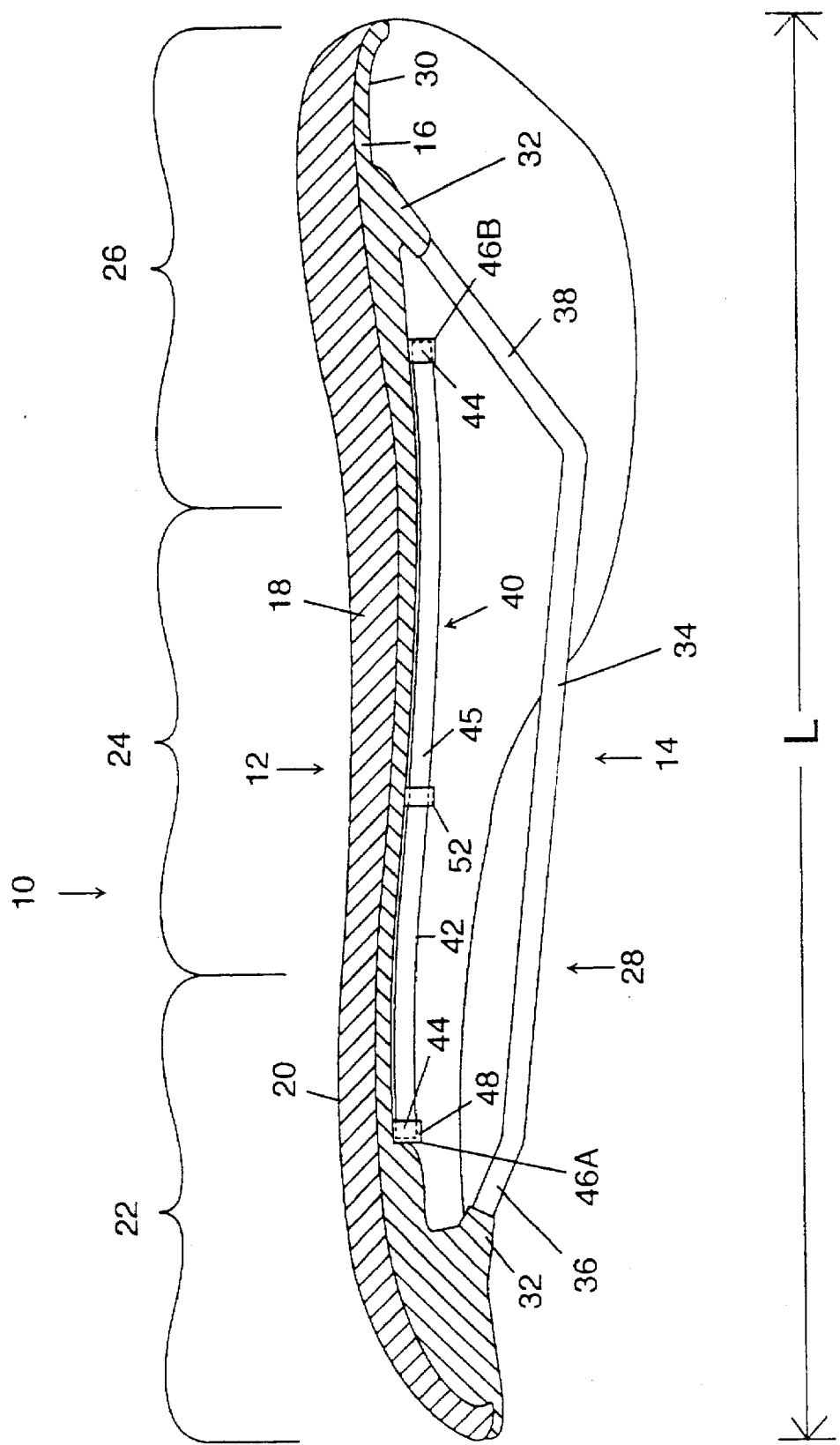
FIG. 1 is a side elevational, cross-sectional, schematic view showing a preferred embodiment of bicycle saddle of the present invention.
Figure 2:
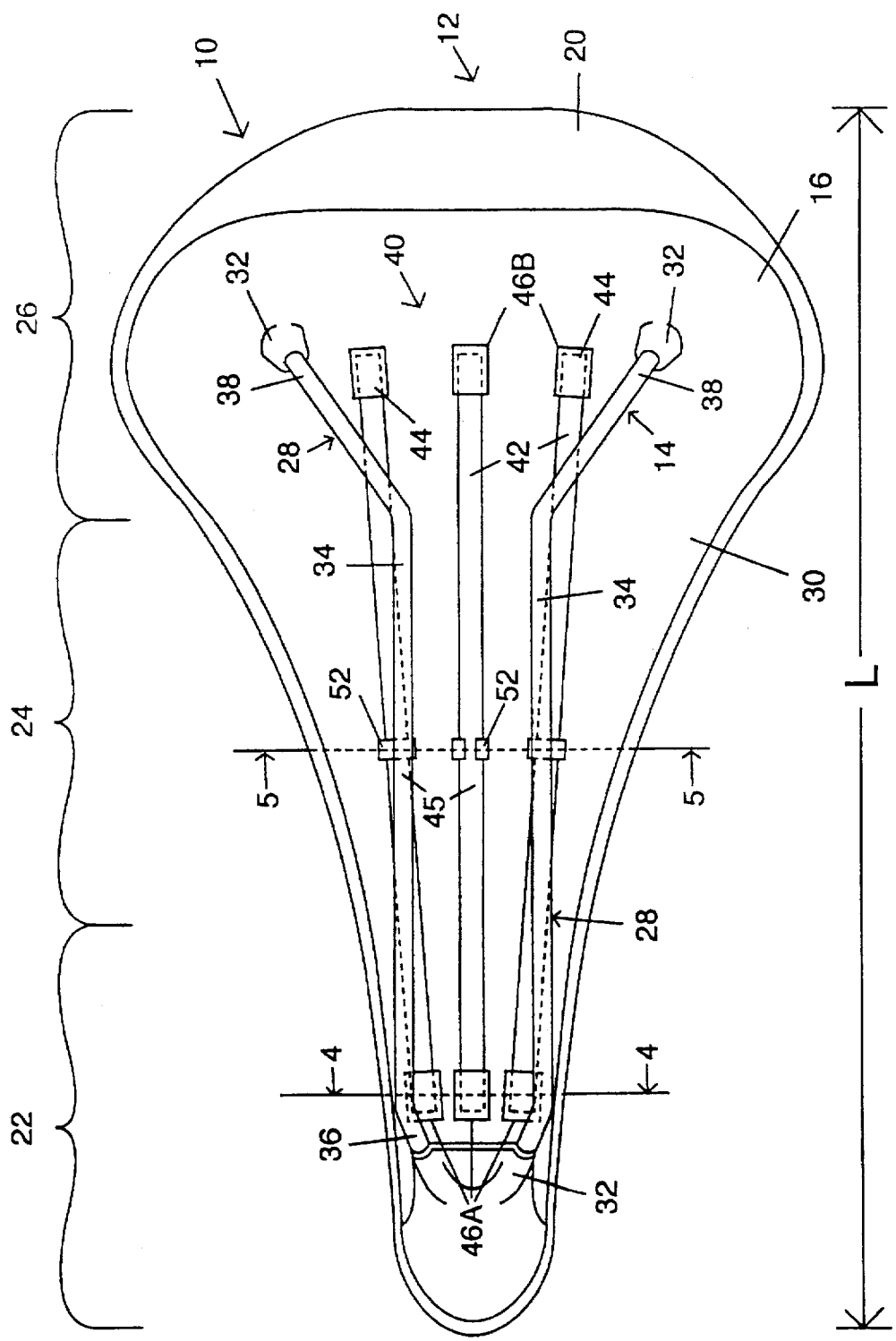
FIG. 2 is a bottom plan, schematic view showing the preferred embodiment of the present invention having a conventional support frame.
Figure 3:
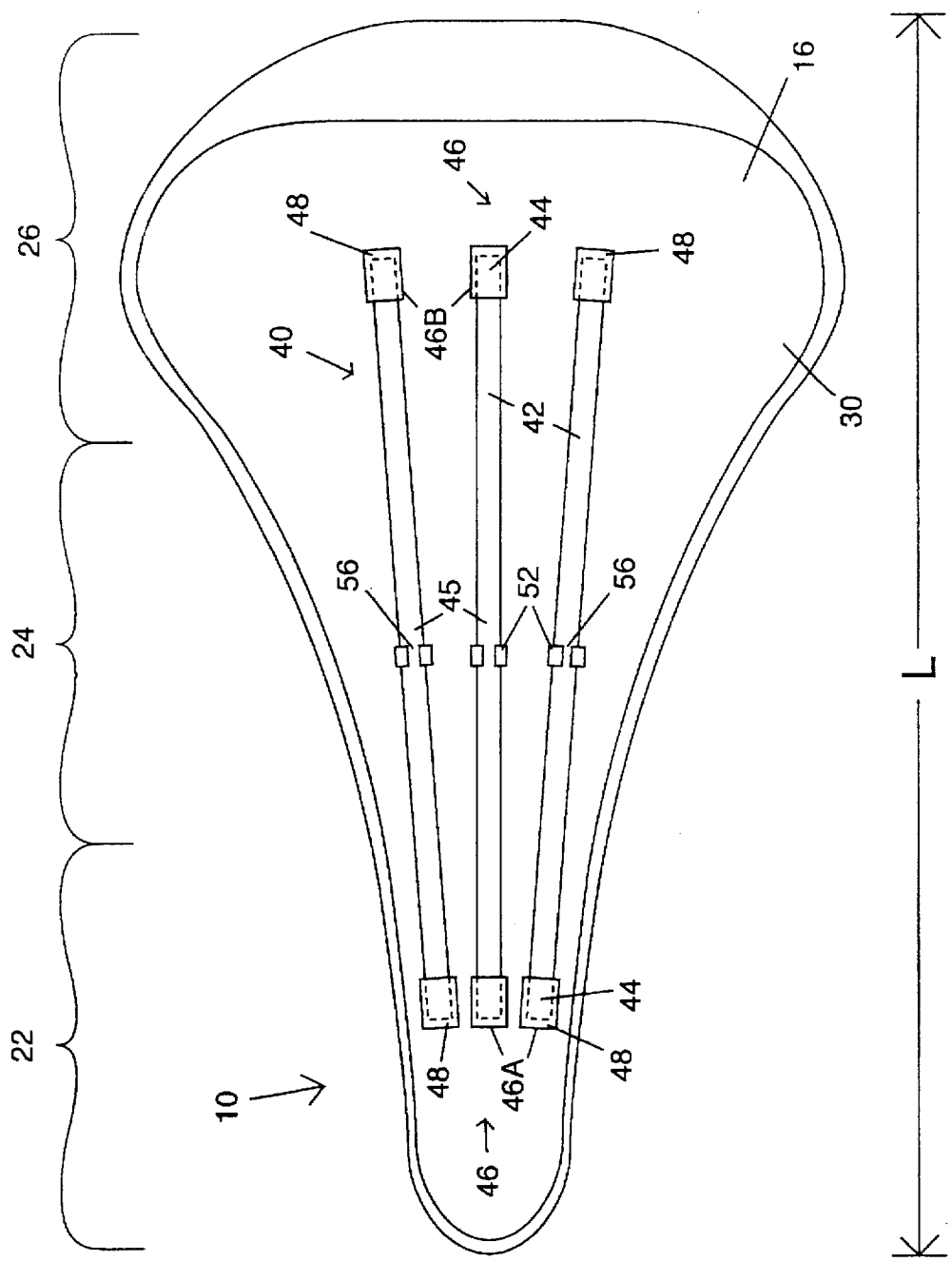
FIG. 3 is a bottom plan, schematic view showing the preferred embodiment without the conventional support frame.

Referring now to FIGS. 1–3 of the drawings, there is shown a preferred embodiment of a bicycle saddle 10 constructed according to the principles of the present invention. The saddle 10 comprises a seat portion shown generally at 12 and a conventional support frame shown generally at 14. The seat 12 typically includes a frame or shell 16 that preferably comprises a known lightweight, semi-rigid injection molded polymeric material. Such materials may include polyvinyl chloride, polyurethane, or polyethylene, for example.

A suitable padding material 18, such as foam rubber, is adhered to the shell 18, for reducing the amount of vibration transmitted to a rider when riding a bicycle (both not shown) that the saddle 10 is mounted on. An appropriate long wearing material covering 20 is secured over the padding 18 to provide a seat 12 suitable for riding. Materials suitable for the covering 20 include leather, vinyl, or other well known materials.

The seat 12 is provided with a somewhat narrow front end region or pommel 22, a transition region 24, and a wide tail portion 26. The saddle 10 has a longitudinal axis L that extends through the front end region 24 and tail portion 26. The tail portion 26 is somewhat wide for supporting a rider and tapers toward the pommel 22, along the transition region 24, to provide thigh clearance between the pommel 22 and tail portion 26 for a rider riding the saddle 10.

The support frame 14, shown in FIG. 1 and FIG. 2, includes a pair of support rails 28 that extend along the longitudinal axis L of the saddle 10 and are secured to an underside 30 of the shell 16 using known means. The underside 30 of the shell 16, for example, may be provided with integrally molded mounting members 32 for receiving ends of the rails 28. The support rails 28 each comprise an intermediate portion 34, an upwardly and forwardly extending front portion 36, and an upwardly and rearwardly extending rear portion 38. The front portion 36 and rear portion 38 of the rails 28 enable the intermediate portion 34 to extend substantially parallel to the transition region 24, at a predetermined distance therefrom. The rails 28 comprise suitable metal alloys that are rigid and lightweight. Metal alloys used for fabricating the rails 28 include aluminum, steel, titanium, or desired compositions of these or other appropriate metal alloys known in the art.

Referring again to FIGS. 1–3 of the drawings, and particularly to FIG. 3, there is shown generally at 40, a variable support assembly of the preferred embodiment of the present invention. The variable support assembly 40 is provided to incrementally alter the weight support characteristics of the saddle 10, to provide a saddle having uniform vibration absorption and weight support for riders of significantly different weight ranges.

The variable support assembly 40 includes a plurality of stiffening means 42 for incrementally increasing or decreasing the flexibility of the shell 16, to provide an increasingly flexible saddle 10, or an increasingly rigid saddle 10. In the preferred embodiment, the stiffening means comprise lightweight, semi-rigid rod members 42 dimensioned to extend from the front end region 22 to the tail portion 26 of the saddle 10.

Preferably, the rods 42 are fabricated from such lightweight, semi-rigid polymeric materials as polyvinyl chloride, polyurethane, or polyethylene. These materials are preferred since different known fabrication techniques can be used with these materials and combinations thereof, for forming rods of different predetermined rigidities, while maintaining the lightweight feature of the rods 42. Additionally, known fibers can be added to the polymeric material for increasing the rigidity of the material, and thus the rod 42. Alternatively, the rods 42 may be fabricated from known carbon fiber compositions, or other suitable materials that provide a lightweight, semi-rigid material suitable to the objectives of the present invention.

In the preferred embodiment, the rods 42 are just sufficiently pliable to enable ends 44 thereof to be deflected relative to a center portion 45 of the rod 42, and also just sufficiently resilient to realign the center 45 of the rod 42 with the ends 44. In the most preferred embodiment, the rods 42 are constructed using the previously discussed fabrication techniques, such that desired ones of the rods 42 are a first predetermined rigidity, and other desired ones of the rods 42 are a second predetermined rigidity, and still other desired ones of the rods are a third predetermined rigidity, so that the invented saddle 10 provides similar support to riders of significantly different weights.

Referring now to the drawing Figures, the variable support assembly 40 further includes a plurality of pairs of receiving members 46. While three pairs of receiving members 46 are shown, it is to be understood that more or less receiving members 46 may be provided depending upon several considerations. Such considerations may include desired support range, desired overall weight of the saddle 10, and size and configuration of the saddle 10. Another consideration is intended use of the saddle 10, such as bicycle racing, long distance touring, or only light recreational uses for example.

The receiving members 46 are provided for detachably coupling the rods 42 to the underside 30 of the shell 16. Preferably, each pair of receiving members 46 includes a front receiving member 46A integrally molded to the underside 30 of the front end region 22 of the shell 16, and a rear receiving member 46B integrally molded to the underside 30 of the tail portion 26 of the shell 16. The front receiving members 46A and rear receiving members 46B are aligned perpendicular to the longitudinal axis L of the saddle 10 and spatially positioned between the rail's mounting members 32, so that rods 42 extending between the members 46A, 46B, are spatially positioned on the underside of the shell 16 when coupled to the receiving members 46.

Figure 4:
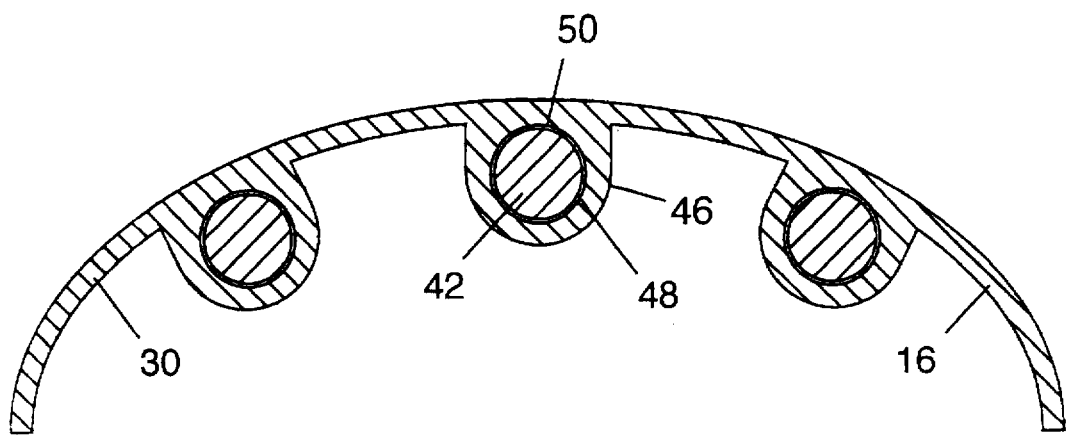
FIG. 4 is a cross sectional view of the shell of the bicycle saddle of the preferred embodiment taken along lines 4—4 of FIG. 2.
Figure 5:
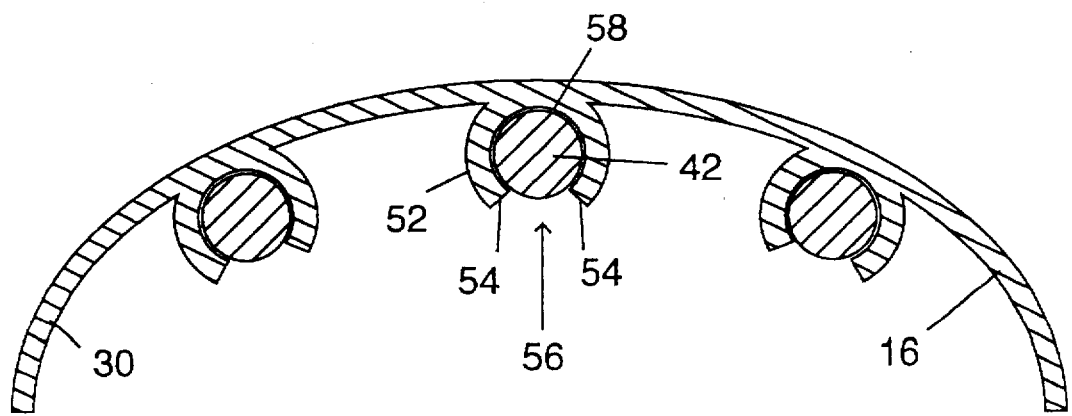
FIG. 5 is a cross sectional view of the shell of the bicycle saddle of the preferred embodiment taken along lines 5—5 of FIG. 2.

Each of the receiving members 46 has an elongated cavity 48 (best seen in FIG. 4) formed complimentary to the cross-sectional configuration of the rod members 42. The cavity 48 is formed in the receiving members 46, so that a portion 50 of the periphery of the cavity 48 is aligned with the underside 30 of the shell 16 and aligned with the longitudinal axis L. The cavities 48 are elongated for receiving the ends 44 of the rods 42, for positively retaining the ends 44 therein and coupling the rods 42 to the receiving members 46. Since the portion 50 of the cavity 48 is aligned with the shell's underside 30, the receiving members 46 retain the rod 42 against the shell's underside 30 to limit movement between the rods 42 and shell 16.

The variable support assembly 40 further comprises a plurality of deflectable clip members 52. A clip 52 is integrally molded to the underside 30 of the transition region 24 of the shell 16 and interposed between each pair of receiving members 46A, 46B. The clips 52 are positioned perpendicular to the saddle's longitudinal axis L, so that the center portion 45 of a rod 42 retained in the clip 52, extends through the clip 52 and substantially parallel with the longitudinal axis L.

Preferably, the clip member 52 has opposing deflectable ends 54 that define an opening 56. The diameter of the opening 56 is substantially less than the diameter of a rod member 42. The ends 54 are deflectable to enable the rod 42 to be force-fit through the opening 56, for snap-fitting the rod 42 to the clip 52. The clip 52 additionally, preferably has a cross-sectional configuration formed complimentary to the cross-sectional configuration of the rods 42. Thus, the rod 42 is snap-fit in the clip 52, to prevent the rod 42 from inadvertently detaching from the clip 52, and the complimentary the cross-sectional configurations of the rod 42 and clip 52, causes the clip 52 to frictionally engage the rod 42, to prevent movement therebetween.

The clip 52 further has a portion 58 of the periphery thereof that is aligned with the shell's underside 30, substantially similar to the cavities 48 of the receiving members 46. When a rod 42 is retained in the clip 52, the clip 52 retains the rod 42 against the shell's underside 30, to limit movement between the rods 42 and shell 16. The clip members 52 also prevent the rods 42 from moving toward and away from each other, when the shell 16 is being flexed by a rider riding the saddle 10 of the present invention. The variable support assembly 40 retains the rods 42 against the underside 30, to inhibit the rods 42 from moving inadvertently relative to the shell's underside 30, such as by moving perpendicularly to the longitudinal axis L of the saddle 10, or by moving away from the underside 30, when the shell 16 is being flexed by a rider riding the saddle 10. This aids with increasing the rigidity of the saddle 10.

Referring still to the drawing Figures, for the purposes of discussion only, the rods 42 fabricated to the first predetermined rigidity are each preferably capable of increasing the weight support capability of the saddle 10, from approximately 5 to approximately 10 pounds per rod 42. Rods 42 fabricated to the second predetermined rigidity are capable of increasing the weight support capability of the saddle 10 from approximately 10 to approximately 25 pounds per rod 42. Lastly, rods 42 fabricated to the third predetermined rigidity are capable of increasing the weight support capability of the saddle from approximately 30 to approximately 50 pounds per rod 42.

Thus, a somewhat lightweight rider, weighing approximately 100 pounds for example, may not want to add any of the rods 42 to the invented saddle 10, since the saddle 10 may provide the rider with sufficient support. However, if the rider is heavier, weighing approximately 135 pounds for example, the rider may want to detachably couple three rods 42 having the first predetermined rigidity to the receiving members 46, for providing the rider with sufficient support. If the rider is somewhat heavier, weighing approximately 200 pounds for example, the rider may want to add two rods of the third predetermined rigidity and one rod of the second predetermined rigidity.

Additionally, the rider may detachably couple only one or two rods 42 to a pair of receiving members 46A, 46B, depending upon the support desired by the rider. Further, the rider can couple rods 42 of any of the predetermined rigidities to the plurality of receiving members 46, depending upon the support, flexibility, and vibration absorption characteristics of the saddle 10 desired by the rider. Thus, any combination of rods 42, from having no rods 42 coupled to the receiving members 46 of the saddle 10, to having three rods of the third predetermined rigidity coupled to the receiving members 46, can be used to provide a saddle 10 that is adjusted to the specific weight of the rider, for providing a saddle 10 having optimal rider support and vibration absorption characteristics for the rider.

Referring still to the drawing Figures, in use, any one of the plurality of rods 42 is individually detachably coupled to a desired pair of the receiving members 46A, 46B for incrementally increasing the rigidity of the shell 16, to provide an increasingly rigid saddle 10. The rods 42 are detachably coupled to the receiving members 46, by first deflecting the ends 44 of a desired one of the rods 42 relative to the center portion 45 thereof. The ends 44 are then disposed in the cavities 48 of the desired pair of the receiving members 46A, 46B. The resiliency of the rod 42 substantially realigns the center 45 of the rod 42 with the ends 44 thereof. The rider then presses the center portion 45 of the rod 42 through the opening 56 in the clip member 52 to snap-fit the rod 42 to the clip 52, thus detachably coupling the rod 42 to the desired pair of the receiving members 46A, 46B.

The rods 42 may be singularly removed from the receiving members 46 for incrementally increasing the flexibility of the shell 16 to provide an increasingly flexible saddle 10. The rod 42 to be removed is first grasped by the rider proximal to the center portion 45 thereof and adjacent to the clip 52. The rod 42 is then pulled away from the shell's underside 30, until the ends 54 of the clip 52 sufficiently deflect and release the rod 42 from the clip 52. The rod 42 is further pulled away from the underside until the ends 44 thereof are removed from the receiving member's cavities 48, for detaching the rod 42 from the receiving members 46.

Thus, there has been described an improved bicycle saddle that provides substantially similar weight support and vibration absorption to riders of significantly different weight ranges. The saddle of the present invention includes a variable support assembly for incrementally altering the rider support characteristics of the saddle. The variable support assembly includes stiffening means that may be either attached or removed from the saddle, for incrementally increasing or decreasing the flexibility of the shell to provide an increasingly flexible saddle, or to provide an increasingly rigid saddle. The stiffening means can be either detachably coupled to, or removed from, the receiving members without necessitating the use of tools, for providing a readily changeable support assembly. The stiffening means are preferably fabricated from lightweight materials and may be different predetermined rigidities, for providing substantially similar support to riders of significantly different weight ranges.

The receiving members are integrally molded to the shell of the saddle to aid with maintaining the invented saddle in the preferred weight range for saddles, of approximately 180 grams to approximately 300 grams. Thus, a substantially lightweight saddle is provided by the o present invention. The receiving members retain the stiffening means against the shell's underside to inhibit the stiffening means from moving inadvertently relative to the shell's underside, such as by moving perpendicularly to the longitudinal axis of the saddle, or by moving away from the underside, when the shell is being flexed by a rider riding the saddle, to aid with increasing the rigidity of the saddle. Additionally, different stiffening means of each of the rigidities may be secured to the receiving members, so that a rider can adjust the support provided by the variable support assembly in substantially small increments, so that the saddle can be adjusted to their specific weight and support needs.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A bicycle saddle having uniform vibration absorption properties and weight support characteristics for riders of different weight ranges, the saddle comprising:

a seat having a front end, a transition region, and a tail portion, the seat having a longitudinal axis extending through the front end and the tail portion, the seat including a shell having an underside;

a support assembly secured to the seat, the support assembly including a pair of support rails extending generally parallel to the longitudinal axis of the seat and secured to the underside of the shell, the rails configured such that each of the rails has an intermediate portion extending parallel to the transition region of the seat at a predetermined distance therefrom; and variable support means for altering the vibration absorption properties and rider support characteristics of the saddle, the variable support means including retaining means affixed to the underside of the shell and stiffening means detachably securable to the retaining means for securing the stiffening means to the shell, the stiffening means detachably securable to the shell for incrementally altering the flexibility of the shell to provide a saddle having uniform vibration absorption properties and weight support characteristics for riders of different weight ranges, the stiffening means comprising at least one elongated, cylindrical rod member, the retaining means having openings for receiving the stiffening means, the openings complementary in shape to the rod members for receiving the rod members.

2. The bicycle saddle of claim 1 wherein the variable support means further comprises:

the retaining means detachably retaining the stiffening means such that the stiffening means extend generally parallel to the longitudinal axis of the seat against the underside of the shell for preventing relative movement between the stiffening means and shell for altering the flexibility of the shell.

3. The bicycle saddle of claim 2 wherein the stiffening means comprises a plurality of semi-rigid rod members detachably securable to the retaining means, the retaining means affixed to the front end, transition region, and the tail portion of the shell, the retaining means comprising receiving portions for receiving either end of a rod member and a transitional member for detachably coupling a center portion of the rod to the underside of the shell, the retaining means maintaining the rod generally parallel to the longitudinal axis of the seat and against the underside of the shell to alter the flexibility of the shell; and each of the rods comprising the stiffening means individually detachably secured to the retaining means for incrementally altering the flexibility of the shell when a rider is riding the saddle, wherein one or more rods is singularly removed from the retaining means for incrementally increasing the flexibility of the shell for providing an increasingly flexible saddle, and one or more rods is singularly detachably secured to the retaining means for incrementally decreasing the flexibility of the shell to provide an increasingly rigid saddle.

4. The bicycle saddle of claim 3 wherein the rod members are fabricated from lightweight, semi-rigid material, such that each of the rods is a predetermined one of a first stiffness, a second stiffness, and a third stiffness for providing similar support to riders of significantly different weights.

5. A bicycle saddle providing uniform vibration absorption and support to riders of significantly different weight ranges, the saddle comprising:

a seat having a front end, a transition region, and a tail, the seat having a longitudinal axis extending through the front end and the tail, the seat including a semi-rigid polymeric shell having an underside;

a support assembly secured to the seat, the support assembly including a pair of support rails extending generally parallel to the longitudinal axis of the seat and secured to the underside of the shell, the rails configured such that each of the rails has an intermediate portion extending parallel to the transition region of the seat at a predetermined distance therefrom; and a variable support assembly for incrementally altering the vibration absorption properties and rider support characteristics of the saddle, the variable support assembly comprising;

a plurality of lightweight, semi-rigid rod members dimensioned to extend from the front end to the tail of the shell;

a plurality of retaining means for detachably coupling the rods to the underside of the shell, one retaining means provided for each rod, each retaining means including, a pair of receiving portions, one of the receiving portions integrally molded to the underside of the front end of the shell and the other receiving portion integrally molded to the underside of the tail of the shell, each of the receiving portions having an elongated cavity formed adjacent to the underside of the shell and aligned with the longitudinal axis of the seat, the cavities for receiving an end of a rod for retaining the rod against the underside of the shell when detachably retained by the retaining means, and a deflectable clip member integrally molded to the underside of the transition region of the shell and interposed between a pair of receiving portions, the clip member being deflectable to snap-fit a center of a rod when coupled thereto for preventing the rod from inadvertently detaching from the clip, the clip member retaining the rod against the underside of the shell when detachably retained by the retaining means, the clip configured to frictionally engage the periphery of the rod to prevent the rod from moving about in the clip while retained therein, the clip preventing the rod from moving perpendicularly to the longitudinal axis of the saddle, when the shell is being flexed by a rider riding the saddle, wherein each of the plurality of rods is individually detachably coupled to each of the retaining means for incrementally limiting the flexibility of the shell, such that the rods are singularly removed from the retaining means for incrementally increasing the flexibility of the shell for providing an increasingly flexible saddle and the rods are singularly detachably coupled to the retaining means for incrementally decreasing the flexibility of the shell to provide an increasingly rigid saddle.

6. The bicycle saddle of claim 5 wherein, the deflectable clip member has a cross sectional configuration complementary to the cross sectional configuration of the rods for frictionally engaging the periphery of a rod retained therein to prevent movement between the rod and the clip, the clip having opposing deflectable ends defining an opening therebetween with a diameter substantially less than the diameter of the rod member, the ends deflectable to enable the rod to be force-fit through the opening for snap-fitting the rod to the clip member.

7. The bicycle saddle of claim 6 wherein the rod members comprise a lightweight, semi-rigid material selected from the group consisting of carbon fiber, polyvinyl chloride, polyurethane, polyethylene, and combinations thereof.

8. The bicycle saddle of claim 7 wherein the rod members are fabricated such that each of the rods is a predetermined one of a first stiffness, a second stiffness, and a third stiffness for providing similar support to riders of significantly different weights.

9. The bicycle saddle of claim 8 wherein rods of the first predetermined stiffness each increase the weight support capability of the saddle ranging from approximately 5 to approximately 10 pounds per rod.

10. The bicycle saddle of claim 8 wherein rods of the second predetermined stiffness each increase the weight support capability of the saddle ranging from approximately 10 to approximately 25 pounds per rod.

11. The bicycle saddle of claim 8 wherein rods of the third predetermined stiffness each increase the weight support capability of the saddle ranging from approximately 30 to approximately 50 pounds per rod.

12. The bicycle saddle of claim 6 wherein the rod members are dimensioned to extend along the longitudinal axis of the seat with ends thereof extending substantially into the cavities of the receiving portions for positively retaining the ends therein, each of the rods just sufficiently pliable to enable the ends of each rod to be deflected relative to the center thereof for disposing the ends of the rod in the receiving portions of a desired one of the retaining means, each of the rods just sufficiently resilient for realigning the center of the rod with the ends thereof for force-fitting the center of the rod through the opening in the clip of the desired retaining means for snap-fitting the rod to the clip and to detachably couple the rod to the desired retaining means.

13. The bicycle saddle of claim 12 wherein the plurality of retaining means are integrally molded on the underside of the shell, such that the receiving portions and clip members of each of the retaining means are aligned perpendicular to the longitudinal axis of the seat for maintaining each of the rod members substantially parallel to the longitudinal axis of the seat with a predetermined distance therebetween.

14. The bicycle saddle of claim 5 wherein the variable support assembly includes no less than two retaining means and no less than two rod members.

15. The bicycle saddle of claim 5 wherein the variable support assembly includes three retaining means and three rod members.

16. In a bicycle saddle comprising a seat and a support assembly, the seat having a front end, a transition region, a tail, and a longitudinal axis extending through the front end and the tail, the seat including a semi-rigid polymeric shell having an underside, the support assembly including a pair of support rails extending generally parallel to the longitudinal axis of the seat and secured to the underside of the shell, the rails configured such that each of the rails has an intermediate portion extending parallel to the transition region of the seat at a predetermined distance therefrom, a variable support assembly for incrementally altering the rider support characteristics of the saddle to provide a saddle having uniform vibration absorption and weight support for riders of significantly different weight ranges, the variable support assembly comprising:

a plurality of lightweight, semi-rigid rod members dimensioned to extend from the front end to the tail of the seat, each of the rods just sufficiently pliable to enable the ends of each rod to be deflected relative to a center thereof and just sufficiently resilient to realign the center of the rod with the ends thereof, the rods fabricated such that each of the rods is a predetermined one of a first stiffness, a second stiffness, and a third stiffness for providing similar support to riders of significantly different weights;

a plurality of retaining means for detachably coupling the rods to the underside of the shell, one retaining means provided for each rod, each retaining means including, a pair of receiving members, one of the receiving members integrally molded to the underside of the front end of the shell and the other receiving member integrally molded to the underside of the tail of the shell, each of the receiving members having an elongated cavity formed complimentary to the cross-sectional configuration of the rod members, the cavity located adjacent to the underside of the shell and aligned with the longitudinal axis of the seat, the cavities receiving an end portion of a rod for retaining the rod against the underside of the shell when detachably coupled to the retaining means, and a deflectable clip member integrally molded to the underside of the transition region of the shell and interposed between a pair of receiving portions, the clip oriented perpendicular to the longitudinal axis of the seat so that the center of a rod retained in the clip extends therethrough in alignment with the longitudinal axis of the seat, the deflectable clip member having a cross-sectional configuration complimentary to the cross-sectional configuration of the rod members for frictionally engaging the periphery of a rod retained therein to prevent movement between the rod and the clip, the clip having opposing deflectable ends defining an opening therebetween with a diameter substantially less than the diameter of a rod member, the ends deflectable to enable the rod to be force-fit through the opening for snap-fitting the rod to the clip member to prevent the rod from inadvertently detaching from the clip and for retaining the rod against the underside of the shell when detachably retained by the retaining means, the clip members preventing the rods from moving toward and away from each other when the shell is being flexed by a rider riding the saddle, wherein each of the plurality of rods is individually detachably coupled to each of the retaining means, such that the rods may be singularly removed from the retaining means for incrementally increasing the flexibility of the shell to provide an increasingly flexible saddle and are singularly detachably coupled to the retaining means for incrementally decreasing the flexibility of the shell to provide an increasingly rigid saddle, each of the rods coupled to the retaining means by deflecting the ends of a desired one of the rods relative to the center thereof for disposing the ends of the rod in the receiving portions of a desired one of the retaining means, the resiliency of the rod realigning the center of the rod with the ends thereof for force-fitting the center of the rod through the opening in the clip of the desired retaining means for snap-fitting the rod to the clip and detachably coupling the rod to the desired retaining means, each of the rods singularly removed from the retaining means by deflecting the center of the rod away from the underside of the shell for deflecting the ends of the clip to release the rod from the clip, the center of the rod deflected away from the underside of the shell until the ends thereof are removed from the receiving portions for detaching the rod from the retaining means.

17. The bicycle saddle of claim 16 wherein the rod members are dimensioned to extend along the longitudinal axis of the seat with ends thereof extending substantially into the cavities of the receiving portions for positively retaining the ends therein.

18. The bicycle saddle of claim 16 further comprising:

the rod members comprising a lightweight, semi-rigid material selected from the group consisting of carbon fiber, polyvinyl chloride, polyurethane, polyethylene, and predetermined combinations thereof, the first predetermined stiffness of each of the rods increases the weight support capability of the saddle ranging from approximately 5 pounds to approximately 10 pounds per rod, the second predetermined stiffness of each of the rods increases the weight support capability of the saddle ranging from approximately 10 pounds to approximately 25 pounds per rod, and the third predetermined stiffness of each of the rods increases the weight support capability of the saddle ranging from approximately 30 to approximately 50 pounds per rod, such that the saddle provides sufficient support to a rider weighing approximately 100 pounds without rod members retained by the retaining means, and desired combinations of the rods are detachably coupled to the saddle for incrementally increasing the support provided by the saddle and determined by the weight range of the rider, such that the saddle provides substantially similar support to different riders of significantly different weight ranges.

* * * * *